Patented May 29, 1945

2,376,919

UNITED STATES PATENT OFFICE 2,376,919

ASBESTOS BOARD

Clyde R. Hutchcroft, Eureka, Pa., assignor to Keasbey & Mattison Company, Ambler, Pa., a corporation of Pennsylvania No Drawing. Application March 14, 1941,
Serial No. 383,449

3 Claims. (Cl. 106—104)

This invention relates to slabs, boards or sheets formed of cement and an inert fibrous material, such as asbestos.

The object of the invention is to provide a composition of this type which will be economical in manufacture, durable in use and have a high dielectric strength.

In order to meet the requirements of service and competition of other insulators, it is desirable that insulating boards of asbestos-cement material provide a resistance of at least ten megohms average for a unit centimeter cube and that no part of the board show a resistance of less than six megohms.

In attaining these desired results I combine with the asbestos an aluminous cement and a filler such as diatomaceous earth. First a slurry is made of a mixture of asbestos fiber and aluminous cement and diatomaceous earth by adding water and agitating it at the same time. The aluminous cement contains a high percentage of aluminum oxide ranging approximately from 35% to 44%, and of ferric oxide ranging approximately from .5% to 14%, and of ferrous oxide ranging approximately from complete absence up to 10.5% while the percentage of silicon oxide and calcium oxide are relatively lower than in Portland cement ranging, for instance, approximately from 4% to 10% for the silicon oxide and 36.5% to 42.5% for the calcium oxide. Other ingredients are magnesium oxide ranging approximately from complete absence to 1.4%, sulphur trioxide ranging approximately from complete absence to 1.25%, and titanium oxide ranging approximately from 1.5% to 2.5%. In comparison with Portland cement the aluminous cement reduces the calcium oxide approximately from 65% to 39%, and the silicon oxide approximately from 22.5% to 6.5%, at the same time increasing the aluminum oxide approximately from 5.5% to 40% and the iron oxides, ferric and ferrous, approximately from 3% to 15%.

In the cement and fiber mixture the proportions may be varied widely depending upon the physical and chemical characteristics desired in the boards. For instance, Chrysotile asbestos fiber may be 225 to 325 parts, the aluminous cement 50 to 70 parts and the diatomaceous earth 20 to 50 parts, a preferred formula being Chrysotile asbestos fibers 275 parts, aluminous cement 60 parts and diatomaceous earth 40 parts. Pulverized silica, alum sludge, marble dust, or other finely divided filler substances may be substituted for the diatomaceous earth if desired.

After the mixture is thoroughly stirred in the slurry, it is run on to a filter bed and pressed hydraulically to express a large quantity of the excess water, the pressures varying from 500 to 4000 pounds per square inch depending upon the thickness of the material desired. After the board has been formed it is removed from the press and allowed to cure and harden. At any time after 48 hours' curing the board may be dried and seven days' curing has been found to be very satisfactory. After drying the board is impregnated with a hot bituminous electrical insulating compound, preferably under pressure. When satisfactorily impregnated the board is removed from the hot compound, cooled, cut to size and sprayed with one or more coats of insulating lacquer or varnish. The material thus produced has an average insulation resistance of 14,000 megohms and a minimum resistance for any part of 6,000 megohms and has a modulus of rupture of 4410 pounds per square inch and an impact strength of about 0.5 foot pound. The moisture content is approximately 0.042% and the water absorption is .614%. The material is not softened by a heat of 392° F. and its hardness by the Brinell ball with a 10 mm. ball at 500 kg. for thirty seconds test is 16. These characteristics give the board the desired advantages of great durability and higher dielectric strength.

The alkalinity of asbestos insulating boards may be determined by grinding the sample to pass entirely through a twenty mesh sieve. A one gram sample of the ground material is then soaked in 100 cc. of cold distilled water in a 500 cc. Erlenmeyer flask for twenty-four hours with occasional shaking. The residue is filtered and washed three times with 25 cc. portions of cold distilled water and the filtrate and wash water is then combined and titrated with N/10 HCl, using methyl red indicator, the results being calculated as milligrams of KOH per gram sample. The alkalinity present as calcium and magnesium oxides is determined by titration made with acid and calculated to potassium hydroxide for a standard reference basis.

With this test ordinary asbestos insulating boards have an alkalinity of from 30 to 60 milligrams of KOH per gram. Under the same test asbestos boards made according to the present procedure have a very low relative alkalinity running from 3 to 15 milligrams of KOH per gram with the average board being between 5 to 10 milligrams per gram of sample. Such low alkalinity asbestos board has also been found to have the following desirable physical and chemical characteristics:

1. Moisture content—less than 0.10%, namely about 0.042%.
2. Water absorption—less than 0.75%, namely 0.614%.

The determination is as follows:

Immerse the test specimen one inch by three inches by the thickness of the material, with all surfaces smoothly cut, which has been dried for one hour at from 221° to 230° Fahrenheit in water at 68° Fahrenheit plus or minus 5° Fahrenheit for at least 96 hours. Remove, wipe dry, and weigh. Using the weight of the dried specimen, calculate the difference in weight as percentage of water absorbed.

3. Insulation resistance—minimum average 10,000 megohms or more, namely 14,000 megohms, with no single reading less than 6,000 megohms.
4. Modulus of rupture at least 3,000 pounds per square inch, namely 4,410 pounds per square inch.
5. Impact strength—average at least 0.300 foot pound, namely 0.500 foot pound.

The measurement is made as follows:

Test flatwise on the front surface of unnotched specimens reporting the length and width of the panel as described in A. S. T. M. Standard D-256-28T using the Charpy test.

6. Swelling—not more than 2 mils per inch of thickness, namely 0.059 mils per inch. The determination is made as follows:

Perform the test on the dried sample used in the water absorption test. Measure the thickness on the original specimen on a marked point near its center. Measure again at the same point after immersion in water for 96 hours and express the difference in mils.

7. Heat effect—no softening at 392° F.
8. Ease of cutting—the board is reasonably soft so as to cut and drill easily and does not chip readily when being drilled.

Such boards, therefore, not only have low alkalinity and a high dielectric strength but also attain other desirable characteristics of strength and durability.

I claim:

1. An electrical insulating material comprising in its composition asbestos fibers 225 to 325 parts, aluminous cement 50 to 70 parts, a filler 20 to 50 parts, and a bituminous electrical insulating compound impregnating said mass and diffused therethrough, so that said insulating material is easily drilled and cut and has an alkalinity ranging from 3 to 15 milligrams of potassium hydroxide per gram of insulating material when the alkalinity has been calculated as potassium hydroxide and the water absorption of said material is of the order of 0.75% or less.
2. An electrical insulating material as set forth in claim 1 in which the filler is amorphous silica.
3. An electrical insulating material as set forth in claim 1 in which the filler is diatomaceous earth.

CLYDE R. HUTCHCROFT.